United States Patent
Cid-Aguilar et al.

(10) Patent No.: US 9,650,288 B2
(45) Date of Patent: May 16, 2017

(54) AQUA BLUE GLASS COMPOSITION

(71) Applicant: VIDRIO PLANO DE MEXICO, S.A. DE C.V., Garcia (MX)

(72) Inventors: Jose Guadalupe Cid-Aguilar, Monterrey (MX); Roberto Marcos Cabrera-Llanos, Santiago (MX); Jose Luis Tavares-Cortes, Apodaca (MX)

(73) Assignee: Vidrio Plano de Mexico, S.A. de C.V., Nuevo León (MX)

( * ) Notice: Subject to any disclaimer, the term of this patent is extended or adjusted under 35 U.S.C. 154(b) by 0 days.

(21) Appl. No.: 14/653,325

(22) PCT Filed: Dec. 19, 2013

(86) PCT No.: PCT/MX2013/000190
§ 371 (c)(1),
(2) Date: Nov. 21, 2015

(87) PCT Pub. No.: WO2014/098555
PCT Pub. Date: Jun. 26, 2014

(65) Prior Publication Data
US 2016/0115072 A1    Apr. 28, 2016

(30) Foreign Application Priority Data
Dec. 19, 2012 (MX) .................. MX/a/2012/015215

(51) Int. Cl.
*C03C 3/087* (2006.01)
*C03C 4/02* (2006.01)

(52) U.S. Cl.
CPC ............... *C03C 4/02* (2013.01); *C03C 3/087* (2013.01)

(58) Field of Classification Search
CPC .. C03C 3/087; C03C 4/02; C03C 4/08; C03C 4/082; C03C 4/085
See application file for complete search history.

(56) References Cited

U.S. PATENT DOCUMENTS

| | | | |
|---|---|---|---|
| 5,688,727 A | | 11/1997 | Shelestak et al. |
| 5,837,629 A | * | 11/1998 | Combes ............ C03C 3/087 501/57 |
| 6,413,893 B1 | * | 7/2002 | Shelestak ........... C03C 3/087 501/70 |
| 2002/0058579 A1 | * | 5/2002 | Seto ................... C03C 3/087 501/71 |
| 2002/0198094 A1 | | 12/2002 | Arbab et al. |
| 2005/0032624 A1 | * | 2/2005 | Teyssedre ........... C03C 1/10 501/71 |
| 2005/0170944 A1 | | 8/2005 | Arbab et al. |
| 2009/0042712 A1 | | 2/2009 | Teyssedre et al. |

FOREIGN PATENT DOCUMENTS

| | | |
|---|---|---|
| GB | 2274841 | 8/1994 |
| WO | 9920577 | 4/1999 |
| WO | 2007112426 | 10/2007 |

OTHER PUBLICATIONS

PCT/MX2013/000190 International Search Report, mailed May 5, 2014, (2 pgs.).

* cited by examiner

*Primary Examiner* — Elizabeth A Bolden
(74) *Attorney, Agent, or Firm* — Andrew C. Siminerio

(57) ABSTRACT

The present invention relates to an aqua blue glass composition having a base composition of a soda-lime-silica glass having as main coloring agents total iron, expressed as $Fe_2O_3$ in the range of 0.30 to 0.60% by weight with a ratio of ferrous (redox) in the range of 20 to 30; FeO in the range of 0.06 to 0.18% by weight; $TiO_2$ in the range of 0.025 to 1.0% by weight; $Co_3O_4$ expressed in the range of 5 to 30% ppm; Se expressed in the range of 0.1 to 10 ppm; CuO in the range of 0 to 400 ppm; and $Cr_2O_3$ in the range of 10 to 20 ppm. The glass provides light transmittance, illuminant "A", greater than 50%, a dominant wavelength (λ) of 487 nm to 498 nm; a solar energy transmittance of less than or equal to 64.4%; an ultraviolet solar transmittance no more than 51.6%; and an excitation purity less than 12 for glass thicknesses from 4 to 12 mm.

4 Claims, No Drawings

AQUA BLUE GLASS COMPOSITION

FIELD OF THE INVENTION

The present invention relates to an aqua glass composition for automotive or construction use, which has a light transmittance (TLA), illuminant "A", greater than 50%; a dominant wavelength (λ) of 487 ηm to 498 ηm; and an excitation purity of less than 12 for glass thickness between 3 to 12 mm.

BACKGROUND OF THE INVENTION

Glass used in buildings and vehicles protects in general from environment such as rain, wind, noise, and keeps ambient temperature within buildings or houses etc., allowing more pleasant indoor conditions. However, ordinary glass does not protect from solar radiation, since it only absorbs a part of the UV radiation, reflecting a total of about 7% and transmitting much of the solar spectrum.

Solar control refers to the ability to change the amount of transmitted or reflected solar radiation, in the near ultraviolet spectral ranges (UV; 300-380 nm), visible (VIS; 380-780 nm) and infrared (IR; 780-2500 nm). Low transmittance is generally pursued in UV and IR ranges, while the VIS transmittance may be high (>70%) or low, depending on application.

There are many choices for obtaining solar control properties to reduce energy transmittance through glass and the properties of absorption and reflection of glass sheets.

At present there are a number of blue glass types for the construction or automotive industry, based on a composition of soda-lime-silica glass.

The blue color can be obtained with iron only, by changing the balance to relatively high Redox values, close to 50%; unlike this production method, vacuum is avoided for refining, that is, the same standard cast-refining process is used as in the manufacture of commercial green, gray, bronze and clear solar control glass.

There exist developments for blue colored glasses, for example U.S. Pat. No. 5,070,048 refers to a blue glass components comprising a soda-lime-silica conventional base glass and specific amounts of $Fe_2O_3$, $Co_3O_4$, NiO, and optionally Se, resulting in an illuminant C transmittance of 54%+/−3% for a quarter inch thickness, dominant wavelength of 482 nm+/−0.1 nm, and a color purity of 13%+/−0.1%.

The U.S. Pat. No. 6,313,053 relates to a blue glass composition that absorbs infrared and ultraviolet radiation having a composition of soda-lime-silica based glass and additionally iron and cobalt, and optionally chromium, as materials absorbing solar radiation and colorants. In particular, blue colored glass includes about 0.40 to 1.0% by weight total iron, preferably about 0.50 to 0.75% by weight, about 4 to 40 ppm CoO, preferably 4 to 20 ppm, and 0 to 100 ppm $Cr_2O_3$. The redox ratio for the glass of the present invention is greater than 0.35 to about 0.60, and preferably between about 0.36 to 0.50. In a particular embodiment of the invention, the glass has a luminous transmittance of at least 55% and a color characterized by a dominant wavelength of 485-489 nanometers and a purity of about 3 to 18 percent. In another embodiment of the invention, the glass has a luminous transmittance of at least 65% in a thickness of about 0.154 inch (3.9 mm) and a color characterized by a dominant wavelength of 485-492 nanometers and a purity of about 3 to 18 percent.

The U.S. Pat. No. 6,995,102 relates to a blue glass composition comprising a soda-lime-silica based composition and a colorant portion consisting essentially of about 0.4 to 0.65 weight percent total iron oxide, about 0.1 to 0.3 weight percent manganese oxide, and cobalt oxide in an amount effective for producing a cobalt concentration of 0.0002 to 0.00013% by weight (about 2 to 13 ppm). The glass is characterized by a ratio of ferrous oxide to total iron oxide between about 0.43 and 0.58. The glass composition has a combination of high visible transmittance, high infrared absorption and an improved blue coloration. This is largely attributed to the combination of iron oxide and cobalt oxide and to the manganese oxide effect in reducing the formation of iron sulfide, thereby preventing the amber coloration.

U.S. Pat. No. 7,670,977 relates to a glass composition of the soda-lime-silica type comprising blue coloring agents in an amount varying within the following limits by weight: TABLE-US-00001 $Fe_2O_3$ (total iron) 0.2 to 0.51%, CoO 10 to 50 ppm, $Cr_2O_3$ 10 to 300 ppm, CuO 0-400 ppm, the glass exhibits a redox factor less than 0.35, a Lambda.sub.D dominant wavelength between 485 and 489 nm, less than 13% purity and selectivity at least equal to 1.1 for a thickness of between 3 and 5 mm. It also relates to a glass sheet obtained from the above composition, said sheet is intended in particular to form an automotive or construction industry window.

The U.S. Pat. No. 8,187,988 relates to a blue glass composition for manufacturing windows, using a soda-lime-silica type base glass composition comprising blue coloring agents as mentioned below in an amount varying within the following limits by weight: TABLE-US-00001 $Fe_2O_3$ (total iron) from 0.2 to 0.51%; CoO 10 to 50 ppm; $Cr_2O_3$ 10 to 300 ppm; CuO 0-400 ppm, glass presenting a redox factor less than 0.35, a dominant wavelength (λ) SUB.D between 485 and 489 nm, an excitation purity of at least 13%, and a selectivity at least equal to 1.1 for a thickness of between 3 and 5 mm. It also relates to a glass sheet obtained from the above composition, said sheet being intended in particular to form an automotive or construction industry window.

Furthermore, it is well known by those skilled in the art, that the addition or substitution of one or more dyes instead of other or others, or changing the proportional amount relative to the glass composition, affects not only the product color, such as the dominant wavelength or color excitation purity, but also the luminous transmission, the heat absorption and additional properties such as the transmittance of ultraviolet and infrared radiation.

For example, iron is present in (soda-lime-silica) glass in two oxidation states: as ferrous oxide (FeO) and ferric oxide ($Fe_2O_3$). Each state of oxidation-reduction confers different properties; the ferrous ion has a broad and strong absorption band centered at 1050 nm, which results in a decrease of infrared radiation. Furthermore, this band extends to the visible region decreasing light transmittance and imparting a bluish coloration to glass; on the other hand, the ferric ion has a strong absorption band located in the ultraviolet region which prevents the transmission of ultraviolet radiation through the glass and two weak bands in the visible region located between 420 and 440 nm, which causes a slight decrease of light transmittance and yellowing in the glass.

The balance between ferrous and ferric oxide has a direct effect on the color and transmittance properties of the glass.

$$\% \ Fe^{+2}(Ferrous) = \frac{FeO \times 100}{Fe_2O_3 \ Total}$$

$$\% \ Fe^{+3}(\text{Ferric}) = \frac{Fe_2O_3 \times 100}{Fe_2O_3 \ \text{Total}}$$

This means that the higher the amount of ferric iron ($Fe^{+3}$) present in the glass, the greater the absorption of ultraviolet radiation and light transmittance will increase; as well as the yellowish hue; but, if the content of ferrous iron ($Fe^{+2}$) increases as a result of chemical reduction of $Fe_2O_3$, the absorption of infrared radiation increases, but the absorption of ultraviolet radiation decreases and also the light transmission (undesirable).

$$Fe^{3+}(\text{yellow}) \leftrightarrows Fe^{2+}(\text{blue}) [\text{yellow+blue=green}]$$

$$2Fe_2O_3 \leftrightarrows 4FeO + O_2$$

Varying the concentration of FeO in relation to $Fe_2O_3$ results in a change of color in the glass. The shift in hue can be changed from yellow (less Tuv, greater TL and Ts) through green, blue till reaching amber. Color changes as follows (experimental results)

Yellow—Low ferrous (12%)—High light transmission (high ferric ion)
Greenish yellow (16%)
Yellowish green (20%)
Green (25% typical green glass value)
Bluish green (29%)
Greenish blue (35%)
Blue (50%)
Olive green (60%)
Champagne (65%)
Amber—High ferrous (75%)—Low light transmission (low ferric ion)

In order to control the balance between ferrous and ferric oxide necessary to achieve solar control glass, it is necessary to establish the conditions; in mix and melting atmosphere; for the first case, the concentration of reducing agents such as coal and oxidant agents such as sodium sulfate and sodium nitrate is adjusted. As for melting conditions, it is necessary to adjust the atmosphere with varying oxygen content; depending on the thermal performance and the desired glass hue.

Titanium Oxide ($TiO_2$) in Soda-Lime-Silica Glasses

The most stable titanium form in glasses is the tetravalent ($Ti^{4+}$) form. The trivalent form may confer coloration, however this effect is not found in soda-lime-silica glass. The document "Effects of titanium dioxide in glass" by MD Beals, The Glass Industry, September, 1963, pp 495-531, describes the interest in titanium dioxide as a glass component. The effects of the use of titanium dioxide include comments about $TiO_2$ greatly increasing the refractive index, increasing light absorption in the ultraviolet region, and reducing viscosity and surface tension. From data on the use of titanium dioxide in enamel, it was found that $TiO_2$ increases chemical durability and acts as a flux. In general, clear glasses containing titanium dioxide can be found in all common glass formation systems (borates, silicates and phosphates). The different regions of glass formation for systems containing titanium dioxide are not grouped in a single place, since the organization of the discussion is based more on the properties of glasses containing titanium dioxide rather than their own constitution.

Moreover, addition of selenium to soda-lime-silica glass can produce a pink color due to the presence of atomic selenium. Selenium is one of the more to widely used, physical bleaching agents for glasses containing iron traces due to undesirable impurity in the raw materials, since its coloration neutralizes ferrous and ferric ions present in the glass.

The combination of iron and selenium in soda-lime-silica glass imparts a reddish-brown color and a decrease in light transmission due to an absorption band located in the visible region between 490 and 500 nm (similar to the atomic selenium band). This band extends into the ultraviolet region, causing also a decrease of transmittance in this type of glass.

The intensity of staining and the final properties of the glass are based on the concentration of iron oxide and selenium in glass.

For concentrations higher than 0.1% $Fe_2O_3$ it is necessary to use selenium together with small amounts of cobalt oxide <0.0001% since it best compensates the hue resulting from the iron contents; these mixtures achieve the neutral tone, however, there is an alteration in visible transmittance.

The copper oxide is incorporated as a key element in developing turquoise blue color necessary to adjust or compensate the yellowing that could develop as a result of incorporation of titanium dioxide and chromium oxide.

It is well known that copper has played an important part in the production of glass, ceramics and colored pigments. For example, the coloration of the Persian ceramics has been recognized for its tonality conferred by copper. Of special interest for ceramic artists are the turquoise blue and especially the Egyptian and Persian dark blue colors (Waldemar A. Weil; Colored Glasses, Society of Glass Technology, Great Britain, P. 154-167, 1976).

Copper has been used in glass compositions, not only in those of soda-lime-silica type, but in some others, such as those containing borosilicate, for example. Therefore, the developed color depends on the base glass, on its concentration and its oxidation state.

In the case of a soda-lime-silica type base glass, copper in oxide form imparts a coloration of a greenish blue hue, specifically turquoise, however, in glass, copper can be in its monovalent state, which does not impart any color. So, the greenish blue coloration depends not only on the amount of copper present, but on the ionic balance between the cuprous and cupric states. The maximum absorption of copper oxide is in a band centered at 780 ηm and a weak secondary peak is present at 450 ηm, which disappears at high soda content (about 40% by weight) (C. R. Bamford, Colour Generation and Control in Glass, Glass Science and Technlogy, Elsevier Scientific Publishing Company, P. 48-50, Amsterdam, 1977).

Although the above described glasses are acceptable for some applications, what is sought is values of visible light transmittance (TL) greater than 50% when the glass is used in the construction industry and the thickness may reach up to 12 mm; on the other hand, when the glass is used in automotive windows and windshields, transmittal values should be greater than 70%.

The present invention provides good control of solar transmission, due to the incorporation of iron oxide ($Fe_2O_3$), and shows a reduction of UV radiation due to the incorporation of titanium dioxide ($TiO_2$) and small amounts of selenium (Se). Likewise, chromium oxide ($Cr_2O_3$) can be optionally incorporated to increase this value. Aqua blue coloration is obtained by combinations of iron oxide ($Fe_2O_3$) And cobalt oxide ($CO_3O_4$).

The addition of copper oxide (CuO) in combination with iron oxide, cobalt oxide, selenium and titanium oxide is used as an alternative for obtaining a blue hue for use in the automotive or construction industry, which has a light is transmission (TLA), illuminant "A" greater than 50%, a dominant wavelength (λ) of 487 nm to 498 nm, and an excitation purity of less than 12 for glass thickness between 3 and 12 mm.

It has been found that in industrial production adding CuO in concentrations below 120 ppm is feasible for a thickness of 4 mm, and less than 100 ppm for a thickness of 6.0 mm The glass can also be manufactured in smaller thicknesses such as glass used in the manufacture of windshields. If higher concentrations of CuO are present during formation within the float bath, a process of reduction attributable to the process atmosphere could occur, causing a reddish color in the glass surface, which can be observed as a reflection. This effect is related to the residence time and the speed of advance of the glass ribbon, which means that at lower speeds, it is necessary to reduce the content of CuO in glass.

As seen from the above, the present invention has the advantage that it can be used both in the construction industry and in the automotive industry, since the values of visible light transmittance (TL) are greater than 50% when glass is used in the construction industry and thickness may reach up to 12 mm; on the other hand, when the glass is used in windows and automotive windshields, transmittal values should be greater than 70%.

OBJECTIVES OF THE INVENTION

It is therefore a principal object of the present invention to provide an aqua blue glass composition that can be used in the automotive and construction industry, by having visible light transmission (TL) values greater than 50%.

A further object of the present invention is to provide an aqua blue glass composition which has a light transmission (TLA), illuminant "A", greater than 50%, a dominant wavelength (λ) 487 ηm to 498 ηm; and an excitation purity of less than 12 for glass thickness between 3 and 12 mm. When focus is on the automotive market, glass meets government regulations that indicate values greater than 70%, in laminated glass (windshield) and front doors, and the thicknesses are less than 6 mm.

It is a further object of the present invention to provide an aqua blue glass composition wherein the visible transmission is not affected.

These and other objects and advantages of aqua blue glass of the present invention will become apparent to those skilled in the art, from the following detailed description.

DETAILED DESCRIPTION OF THE INVENTION

The typical composition of a soda-lime-silica glass used in the automotive industry, and formed by the well known float glass process, is characterized by the following formulation in weight percent based on the total weight of the glass:

| Component | % weight |
|---|---|
| $SiO_2$ | 68 to 75 |
| $Al_2O_3$ | 0 to 5 |
| CaO | 5 to 15 |
| MgO | 0 to 10 |
| $Na_2O$ | 10 to 18 |
| $K_2O$ | 0 to 5 |
| $SO_3$ | 0.05 to 0.3 |

The aqua blue glass composition of the present invention is based on the above-described composition to which the following dye compounds have been added:

| Component | % weight |
|---|---|
| $Fe_2O_3$ | 0.30 to 0.60 |
| % Ferrous | 20 to 30 |
| FeO | 0.06 to 0.18 |
| $TiO_2$ | 0.025 to 1.0 |

| Components | ppm |
|---|---|
| $Co_3O_4$ | 5 to 30 |
| Se | 0 to 10 |
| CuO | 0 to 400 |
| $Cr_2O_3$ | 10 to 20 |

To verify the advantages of the present invention, Examples 1 to 9 show the experimental results of the soda-lime-silica composition with different combinations of iron oxide ($Fe_2O_3$) and cobalt oxide (expressed as $Co_3O_4$); Iron oxide ($Fe_2O_3$) and selenium (Se); and iron oxide ($Fe_2O_3$) and titanium oxide ($TiO_2$). These examples were carried out independently, without considering any combination of dyes.

By adding Iron oxide ($Fe_2O_3$) and cobalt oxide (expressed as $CO_3O_4$) compounds to the base composition and using iron in two oxidation states: as ferrous oxide (FeO) and ferric oxide ($Fe_2O_3$) (Examples 2 and 3) a glass sheet was manufactured with a thickness of about 4 mm, resulting in a visible light transmittance of at least 55.9%, an ultraviolet radiation transmittance coefficient to less than 42.8%, a coefficient of direct solar transmittance of no more than 68.6%; and a tint color as defined in CIELAB illuminant D65 and 10° standard observer) in the ranges a* (red-green) −3.5 to −4.0; b* (blue-yellow) −17.0 to −4.6.

With the combination of the compounds Iron oxide ($Fe_2O_3$) and Selenium (Se) added to the base composition and using iron in two oxidation states: as ferrous oxide (FeO) and ferric oxide ($Fe_2O_3$) (Examples 4 and 5) a sheet of glass was manufactured with a thickness of about 4 mm, resulting in a visible light transmittance of at least 68.6%, ultraviolet radiation transmittance coefficient at least 32.7%, a coefficient of direct solar transmittance of no more than 64.9%; and a tint color as defined in CIELAB illuminant D65 and 10° standard observer, in the ranges a* (red-green) of 1.8 to 4.7; b* (blue-yellow) 10.9 to 6.9.

Finally, with the combination of compounds Iron oxide ($Fe_2O_3$) and Titanium Oxide ($TiO_2$) added to the base composition and using the iron in two oxidation states: as ferrous oxide (FeO) and ferric oxide ($Fe_2O_3$) (Examples 7, 8 and 9) a sheet of glass was manufactured with a thickness of about 4 mm, resulting with a visible light transmittance of at least 72.3%, a coefficient of ultraviolet radiation transmittance at least 29.2%, a coefficient of direct solar transmittance of no more than 48.3%; a dominant wavelength of at least 521.8 nm; a purity of less than 4.7%, and a color dye as defined in CIELAB illuminant D65 and 10° standard observer, in the ranges a* (red-green) from 7.3 to 7.7; b* (blue-yellow) from 3.1 to 5.8.

TABLE 1

Fe$_2$O$_3$—Co$_3$O$_4$, Fe$_2$O$_3$—Se, Fe$_2$O$_3$—TiO$_2$

| | Example | | | | | | | | |
|---|---|---|---|---|---|---|---|---|---|
| | 1 | 2 | 3 | 4 | 5 | 6 | 7 | 8 | 9 |
| Thickness (mm) | 4.00 | 4.00 | 4.00 | 4.00 | 4.00 | 4.00 | 4.00 | 4.00 | 4.00 |
| Composition | | | | | | | | | |
| % Fe$_2$O$_3$ | 0.360 | 0.360 | 0.360 | 0.360 | 0.360 | 0.740 | 0.740 | 0.740 | 0.740 |
| % Ferrous (Redox) | 16.6 | 16.6 | 17.5 | 15.8 | 14.4 | 24.0 | 24.4 | 24.5 | 25.1 |
| % FeO | 0.060 | 0.060 | 0.063 | 0.057 | 0.052 | 0.178 | 0.181 | 0.181 | 0.185 |
| ppm CuO | 0 | 0 | 0 | 0 | 0 | 0 | 0 | 0 | 0 |
| % TiO$_2$ | 0.00 | 0.00 | 0.00 | 0.00 | 0.00 | 0.00 | 0.30 | 0.50 | 0.70 |
| % Co$_3$O$_4$ | 0.0 | 40.0 | 145.0 | 0.0 | 0.0 | 0.0 | 0.0 | 0.0 | 0.0 |
| ppm Se | 0.0 | 0.0 | 0.0 | 16.8 | 26.8 | 0.0 | 0.0 | 0.0 | 0.0 |
| ppm Cr$_2$O$_3$ | 0 | 0 | 0 | 0 | 0 | 0 | 0 | 0 | 0 |
| % Tuv | 56.6 | 57.2 | 57.4 | 42.8 | 32.7 | 37.7 | 34.6 | 31.4 | 29.2 |
| % T$_{LA}$ | 84.8 | 75.3 | 55.9 | 70.8 | 68.6 | 74.3 | 73.6 | 72.9 | 72.3 |
| % Ts | 71.5 | 68.6 | 61.0 | 64.9 | 62.7 | 49.3 | 48.3 | 47.5 | 46.6 |
| L* | 94.1 | 90.4 | 81.7 | 88.5 | 85.9 | 89.8 | 89.4 | 88.9 | 88.6 |
| a* | −2.8 | −3.5 | −4.0 | 1.8 | 4.7 | −7.2 | −7.3 | −7.5 | −7.7 |
| b* | 0.7 | −4.6 | −17.0 | 6.9 | 10.9 | 1.7 | 3.1 | 4.5 | 5.8 |
| % Excitation Purity | 551.5 | 485.6 | 481.2 | 580.0 | 582.5 | 500.6 | 521.8 | 534.7 | 543.5 |
| Dominant Wavelength (nm) | 1.2 | 5.2 | 17.2 | 8.0 | 12.7 | 2.3 | 2.8 | 3.5 | 4.7 |

Tables 2 to 6

Tables 2 to 6 show experimental results of the composition of the present invention with the combination of iron oxide (Fe$_2$O$_3$), titanium oxide (TiO$_2$), selenium (Se) and cobalt oxide (Co$_3$O$_4$). Aqua blue coloration is obtained by combinations of iron oxide (Fe$_2$O$_3$) And cobalt oxide (CO$_3$O$_4$). Copper oxide (CuO) may partially replace cobalt oxide (Co$_3$O$_4$) and titanium dioxide (TiO$_2$) improves blocking of ultraviolet radiation.

Combinations were developed by selecting compounds and various glass thicknesses to determine variations in the visible light transmittance, coefficient of ultraviolet radiation transmittance, direct solar transmittance coefficient; and color dye as defined in illuminant D65 and 10° standard, observer) in ranges a* (red-green); b* (blue-yellow); and value of L*.

Examples 10 to 17 (Table 2) show the results of the soda-lime-silica composition considering the combination of iron oxide (Fe$_2$O$_3$), Selenium (Se), Cobalt Oxide (expressed as Co$_3$O$_4$), Copper Oxide (CuO) and Titanium Oxide (TiO$_2$). This resulted in a visible light transmission of at least 77%; a coefficient of ultraviolet radiation transmittance of no more than 47.5%, a coefficient of direct solar transmittance of no more than 64.4%; and a color dye as defined in CIELAB illuminant D65 and 10° standard observer) in the ranges a* (red-green) of −5.0 to −4.3; b* (blue-yellow) −0.3 to −1.9. A dominant wavelength (λ) of 490.9 ηm to 496.1 ηm; and an excitation purity of less than 3.5 for a glass thickness between 4 and 4.64 mm.

Examples 18-53 (Tables 2 to 6) show the results of the soda-lime-silica composition considering the combination of iron (Fe$_2$O$_3$), Selenium (Se), Cobalt Oxide (expressed as Co$_3$O$_4$) and Titanium Oxide (TiO$_2$), with a zero value of Copper Oxide (CuO). This resulted in a visible light transmittance of at least 61.61%, an ultraviolet radiation transmittance coefficient of at least 36.2%, a direct solar transmittance coefficient of no more than 61.2%; and a tint color as defined in CIELAB illuminant (D65 and 10° standard observer) in the ranges a* (red-green) of −10.2 to −2.8; b* (blue-yellow) 0.1 to 5.8. A dominant wavelength (λ) of 488.5 ηm to 497.8 ηm; and an excitation purity of less than 9.9 for a glass thickness between about 4 and about 10 mm.

TABLE 2

| | Example | | | | | | | | | |
|---|---|---|---|---|---|---|---|---|---|---|
| | 10 | 11 | 12 | 13 | 14 | 15 | 16 | 17 | 18 | 19 |
| Thickness (mm) | 4.30 | 4.14 | 4.12 | 4.05 | 4.00 | 4.27 | 4.12 | 4.64 | 4.09 | 4.05 |
| Composition | | | | | | | | | | |
| % Fe$_2$O$_3$ | 0.440 | 0.440 | 0.440 | 0.440 | 0.440 | 0.440 | 0.440 | 0.440 | 0.422 | 0.451 |
| % Ferrous (Redox) | 21.1 | 22.5 | 19.1 | 19.1 | 23.8 | 18.5 | 24.4 | 18.4 | 25.5 | 25.2 |
| % FeO | 0.093 | 0.099 | 0.084 | 0.084 | 0.105 | 0.082 | 0.107 | 0.081 | 0.107 | 0.114 |
| ppm CuO | 50 | 50 | 50 | 50 | 100 | 200 | 300 | 400 | 0 | 0 |
| % TiO$_2$ | 0.16 | 0.26 | 0.46 | 0.60 | 0.06 | 0.06 | 0.06 | 0.06 | 0.04 | 0.04 |
| % Co$_3$O$_4$ | 15.0 | 15.0 | 15.0 | 15.0 | 15.0 | 15.0 | 15.0 | 15.0 | 18.2 | 11.3 |
| ppm Se | 0.0 | 0.0 | 0.0 | 0.0 | 0.0 | 0.0 | 0.0 | 0.0 | 0.4 | 0.3 |
| ppm Cr$_2$O$_3$ | 20 | 20 | 20 | 20 | 20 | 20 | 20 | 20 | 10 | 10 |
| % Tuv | 48.1 | 47.5 | 47.5 | 44.8 | 49.4 | 47.1 | 51.2 | 46.5 | 51.2 | 50.2 |
| % T$_{LA}$ | 77.9 | 77.0 | 78.3 | 76.0 | 77.5 | 77.0 | 77.9 | 77.0 | 77.4 | 78.7 |
| % Ts | 62.7 | 60.7 | 64.4 | 61.3 | 61.8 | 63.3 | 62.9 | 63.1 | 60.8 | 60.4 |

TABLE 2-continued

|  | Example | | | | | | | | | |
|---|---|---|---|---|---|---|---|---|---|---|
|  | 10 | 11 | 12 | 13 | 14 | 15 | 16 | 17 | 18 | 19 |
| L* | 91.4 | 91.0 | 91.5 | 90.4 | 91.3 | 90.9 | 91.5 | 90.9 | 91.3 | 91.8 |
| a* | −4.7 | −5.0 | −4.3 | −4.6 | −4.8 | −4.3 | −4.6 | −4.4 | −4.6 | −4.7 |
| b* | −1.3 | −1.3 | −0.5 | −0.3 | −1.7 | −0.8 | −1.9 | −0.8 | −1.9 | −0.9 |
| % Excitation Purity | 3.1 | 3.3 | 2.4 | 2.4 | 3.5 | 2.6 | 3.6 | 2.7 | 3.6 | 2.8 |
| Dominant Wavelength (nm) | 492.6 | 492.8 | 494.9 | 496.1 | 494.6 | 493.7 | 490.9 | 494.8 | 491.0 | 493.9 |

TABLE 3

|  | Example | | | | | | | | | |
|---|---|---|---|---|---|---|---|---|---|---|
|  | 20 | 21 | 22 | 23 | 24 | 25 | 26 | 27 | 28 | 29 |
| Thickness (mm) | 4.06 | 5.70 | 5.68 | 5.81 | 6.05 | 5.84 | 5.70 | 5.69 | 5.69 | 5.70 |
| Composition | | | | | | | | | | |
| % $Fe_2O_3$ | 0.417 | 0.457 | 0.520 | 0.457 | 0.400 | 0.468 | 0.438 | 0.430 | 0.504 | 0.444 |
| % Ferrous (Redox) | 25.4 | 25.6 | 25.4 | 25.4 | 25.8 | 25.4 | 25.6 | 25.8 | 25.3 | 25.6 |
| % FeO | 0.106 | 0.117 | 0.132 | 0.116 | 0.103 | 0.119 | 0.112 | 0.111 | 0.128 | 0.114 |
| ppm CuO | 0 | 0 | 0 | 0 | 0 | 0 | 0 | 0 | 0 | 0 |
| % $TiO_2$ | 0.04 | 0.04 | 0.04 | 0.04 | 0.04 | 0.04 | 0.04 | 0.04 | 0.04 | 0.04 |
| % $Co_3O_4$ | 18.6 | 6.9 | 4.3 | 6.8 | 11.4 | 8.7 | 11.0 | 11.5 | 6.7 | 10.3 |
| ppm Se | 0.3 | 0.2 | 0.2 | 0.4 | 0.1 | 0.2 | 0.2 | 0.1 | 0.3 | 0.2 |
| ppm $Cr_2O_3$ | 10 | 10 | 10 | 10 | 10 | 10 | 10 | 10 | 10 | 10 |
| % Tuv | 51.6 | 49.7 | 46.7 | 49.2 | 51.3 | 48.6 | 50.6 | 51.1 | 47.4 | 50.3 |
| % $T_{LA}$ | 77.5 | 75.2 | 74.3 | 74.9 | 74.3 | 74.0 | 74.4 | 74.4 | 74.0 | 74.4 |
| % Ts | 61.2 | 52.2 | 49.5 | 51.8 | 53.2 | 50.9 | 52.7 | 53.0 | 50.0 | 52.5 |
| L* | 91.3 | 90.3 | 89.9 | 90.2 | 89.9 | 89.8 | 90.0 | 90.0 | 89.8 | 90.0 |
| a* | −4.5 | −6.4 | −7.0 | −6.5 | −6.1 | −6.7 | −6.3 | −6.2 | −6.9 | −6.3 |
| b* | −2.0 | −0.5 | 0.1 | −0.4 | −1.6 | −0.9 | −1.3 | −1.4 | −0.4 | −1.1 |
| % Purity | 3.6 | 3.4 | 3.3 | 3.3 | 4.1 | 3.8 | 3.9 | 4.0 | 3.6 | 3.8 |
| Dominant Wavelength (nm) | 490.7 | 495.8 | 497.8 | 496.3 | 492.7 | 494.8 | 493.6 | 493.1 | 496.2 | 494.1 |

TABLE 4

|  | Examples | | | | | | | | | |
|---|---|---|---|---|---|---|---|---|---|---|
|  | 30 | 31 | 32 | 33 | 34 | 35 | 36 | 37 | 38 | 39 |
| Thickness (mm) | 5.75 | 5.75 | 5.75 | 5.73 | 5.67 | 5.73 | 9.97 | 9.86 | 9.94 | 8.16 |
| Composition | | | | | | | | | | |
| % $Fe_2O_3$ | 0.414 | 0.418 | 0.412 | 0.427 | 0.427 | 0.428 | 0.408 | 0.407 | 0.405 | 0.423 |
| % Ferrous (Redox) | 26.0 | 26.0 | 26.0 | 25.6 | 25.3 | 25.4 | 26.4 | 26.4 | 26.5 | 25.8 |
| % FeO | 0.108 | 0.109 | 0.107 | 0.109 | 0.108 | 0.109 | 0.108 | 0.107 | 0.107 | 0.109 |
| ppm CuO | 0 | 0 | 0 | 0 | 0 | 0 | 0 | 0 | 0 | 0 |
| % $TiO_2$ | 0.04 | 0.04 | 0.04 | 0.04 | 0.04 | 0.04 | 0.04 | 0.04 | 0.04 | 0.04 |
| % $Co_3O_4$ | 21.7 | 19.0 | 21.8 | 24.1 | 23.7 | 24.0 | 21.7 | 20.7 | 21.5 | 23.0 |
| ppm Se | 0.2 | 0.2 | 0.2 | 0.0 | 0.3 | 0.1 | 0.1 | 0.1 | 0.1 | 0.1 |
| ppm $Cr_2O_3$ | 10 | 10 | 10 | 10 | 10 | 10 | 10 | 10 | 10 | 10 |
| % Tuv | 44.7 | 44.6 | 44.8 | 43.9 | 43.8 | 43.8 | 33.1 | 33.1 | 33.3 | 36.5 |
| % $T_{LA}$ | 71.3 | 72.0 | 71.3 | 70.8 | 70.8 | 70.6 | 59.5 | 60.0 | 59.7 | 63.7 |
| % Ts | 52.5 | 52.5 | 52.5 | 52.0 | 52.4 | 52.0 | 37.9 | 38.1 | 38.1 | 42.8 |
| L* | 88.7 | 89.0 | 88.7 | 88.5 | 88.5 | 88.4 | 83.4 | 83.5 | 83.4 | 85.3 |
| a* | −6.3 | −6.3 | −6.3 | −6.6 | −6.3 | −6.4 | −10.2 | −10.1 | −10.2 | −8.7 |
| b* | −3.4 | −2.9 | −3.4 | −3.8 | −3.6 | −3.7 | −5.8 | −5.5 | −5.8 | −4.9 |
| % Purity | 5.4 | 5.4 | 5.6 | 6.2 | 5.8 | 6.0 | 9.9 | 9.6 | 9.9 | 8.3 |
| Dominant Wavelength (nm) | 489.1 | 489.3 | 489.2 | 489.3 | 489.3 | 489.3 | 489.3 | 489.6 | 489.3 | 489.4 |

TABLE 5

| | Examples | | | | | | | | | |
|---|---|---|---|---|---|---|---|---|---|---|
| | 40 | 41 | 42 | 43 | 44 | 45 | 46 | 47 | 48 | 49 |
| Thickness (mm) | 8.16 | 8.16 | 6.16 | 5.69 | 5.72 | 5.73 | 5.69 | 5.71 | 5.74 | 5.69 |
| Composition | | | | | | | | | | |
| % $Fe_2O_3$ | 0.423 | 0.427 | 0.437 | 0.415 | 0.419 | 0.414 | 0.411 | 0.416 | 0.411 | 0.410 |
| % Ferrous (Redox) | 25.7 | 25.7 | 25.3 | 26.1 | 26.1 | 26.1 | 26.3 | 26.1 | 26.0 | 26.0 |
| % FeO | 0.109 | 0.110 | 0.111 | 0.108 | 0.109 | 0.108 | 0.108 | 0.108 | 0.107 | 0.107 |
| ppm CuO | 0 | 0 | 0 | 0 | 0 | 0 | 0 | 0 | 0 | 0 |
| % $TiO_2$ | 0.04 | 0.04 | 0.04 | 0.04 | 0.04 | 0.04 | 0.04 | 0.04 | 0.04 | 0.04 |
| % $Co_3O_4$ | 22.9 | 22.9 | 28.0 | 27.4 | 28.0 | 30.8 | 29.1 | 29.8 | 35.4 | 31.7 |
| ppm Se | 0.1 | 0.1 | 2.1 | 1.5 | 1.4 | 2.6 | 2.6 | 2.7 | 4.7 | 3.8 |
| ppm Cr2O3 | 10 | 10 | 10 | 10 | 10 | 10 | 10 | 10 | 10 | 10 |
| % Tuv | 36.5 | 36.2 | 48.7 | 49.8 | 49.5 | 48.7 | 48.8 | 48.6 | 46.8 | 47.8 |
| % $T_{LA}$ | 63.7 | 63.6 | 66.9 | 68.4 | 68.1 | 66.5 | 67.2 | 66.7 | 72.8 | 65.6 |
| % Ts | 42.9 | 42.7 | 50.5 | 51.4 | 51.0 | 50.5 | 50.9 | 50.5 | 58.6 | 50.2 |
| L* | 85.3 | 85.3 | 86.4 | 87.2 | 87.1 | 86.2 | 86.5 | 86.3 | 84.6 | 85.6 |
| a* | −8.7 | −8.8 | −5.6 | −5.7 | −5.7 | −5.4 | −5.2 | −5.4 | −4.7 | −4.9 |
| b* | −5.0 | −4.9 | −3.3 | −3.3 | −3.4 | −3.4 | −3.1 | −3.2 | −3.1 | −2.9 |
| % Purity | 8.3 | 8.3 | 5.4 | 5.4 | 5.6 | 5.4 | 5.1 | 5.2 | 4.9 | 4.7 |
| Dominant Wavelength (nm) | 489.4 | 489.4 | 489.1 | 489.3 | 489.2 | 488.9 | 489.3 | 489.2 | 488.7 | 489.2 |

TABLE 6

| | Examples | | | |
|---|---|---|---|---|
| | 50 | 51 | 52 | 53 |
| Thickness (mm) | 5.76 | 5.68 | 5.66 | 5.69 |
| Composition | | | | |
| % $Fe_2O_3$ | 0.413 | 0.403 | 0.401 | 0.389 |
| % Ferrous (Redox) | 25.9 | 25.6 | 25.6 | 25.6 |
| % FeO | 0.107 | 0.103 | 0.103 | 0.100 |
| ppm CuO | 0 | 0 | 0 | 0 |
| % $TiO_2$ | 0.04 | 0.04 | 0.04 | 0.04 |
| % $Co_3O_4$ | 34.3 | 39.4 | 37.1 | 48.8 |
| ppm Se | 4.9 | 6.8 | 5.9 | 10.1 |
| ppm $Cr_2O_3$ | 10 | 10 | 10 | 10 |
| % Tuv | 46.5 | 45.7 | 46.6 | 43.2 |
| % $T_{LA}$ | 63.7 | 61.6 | 63.1 | 57.3 |
| % Ts | 49.0 | 48.7 | 49.5 | 47.3 |
| L* | 84.6 | 83.4 | 84.2 | 80.9 |
| a* | −4.7 | −3.9 | −4.1 | −2.8 |
| b* | −2.8 | −2.7 | −2.8 | −2.7 |
| % Purity | 4.6 | 4.3 | 4.4 | 3.8 |
| Dominant Wavelength (nm) | 489.3 | 488.5 | 488.6 | 486.9 |

From the above experiments it can be seen that the combination of copper oxide, iron oxide, cobalt oxide, selenium, titanium oxide and chromium oxide provides a glass composition of a blue hue for use both in the automotive and construction industries, with values of visible light transmittance (TL) greater than 50% when the glass is used in the construction industry and the thickness can be up to 12 mm; on the other hand, when the glass is used in automotive windows and windshields, transmittal values should be greater than 70%.

As seen from the above, the present invention has the advantage that it can be used both in the construction industry and in the automotive industry, with values of visible light transmittance (TL) greater than 50% when glass is used in the construction industry and thickness may reach up to 12 mm; on the other hand, when the glass is used in automotive windows and windshields, this value should be greater than 70%.

The physical properties such as light transmittance correspond to calculated variables based on internationally accepted standards. Thus, light transmittance is evaluated using the illuminant "A" and 2° Standard Observer also known as 1931 [Publication CIE 15.2, ASTM E-308 (1990)]. The wavelength range used for these purposes is 380 to 780 ηm, integrating values in numeric form with intervals of 10 nm. Solar energy transmittance represents the heat passing through the glass directly, evaluated from 300 nm to 2500 nm at intervals of 50, 10, 50 nm, the numeric form of calculation uses ISO/DIS 13837 as a recognized standard.

The calculation of the ultraviolet radiation transmittance (UV), involves only the participation of the solar UV radiation, so it is evaluated in the range of 300 ηm to 400 ηm at intervals of 5 ηm, the numeric form of calculation uses ISO/DIS 13837 as a recognized standard.

The amount of solar heat which is transmitted through glass, can also be calculated by the contribution of thermal energy with which it participates in each of the regions where the solar spectrum has influence, that is from the ultraviolet region (280 ηm) to the near infrared region (2500 ηm), which is 3% for UV, 44% for the visible and in the order of 53% for the IR, however, the values of direct solar energy transmission, in the present invention, are calculated based on a numerical integration taking into account the full range of the solar spectrum of 300 to 2500 ηm, with intervals of 50 ηm using solar radiation values reported by the ISO/DIS 13837 standard.

Specifications for determining color such as dominant wavelength and excitation purity, have been derived from the Tristimulus values (X, Y, Z) which have been adopted by the International Commission on Illumination (CIE), as a direct result of experiments involving many observers. These specifications can be determined by calculating the x, y, z trichromatic coefficients of the Tristimulus values corresponding to the red, green and blue colors respectively. Tristimulus values are plotted on the chromaticity diagram and compared with the coordinates of the illuminant "D65" considered as illumination standard. The comparison provides the information to determine the color excitement purity and its dominant wavelength. The dominant wavelength defines the color wavelength and its value is in the visible range of 380 to 780 ηm, whereas for excitation purity, the lower the value, the nearest it tends to be a neutral color. A deeper understanding of these issues can be obtained from the "Handbook of Colorimetry" published by the "Massachusetts Institute of Technology" by Arthur C. Hardy, issued in 1936.

From the above, a neutral gray glass composition has been described and will be apparent to those skilled in the art that other possible advances and improvements can be performed, which may be considered within the field determined by the following claims.

We claim:

1. A blue glass composition comprising a sodium-calcium-silicate base glass and a colorant, wherein said colorant consisting essentially of: total iron, expressed as $Fe_2O_3$ from 0.30 to 0.60% by weight, with a ratio of ferrous (redox) in the range of 20 to 30%; FeO from 0.06 to 0.18% by weight; $TiO_2$ from 0.025 to 1.0% by weight; $Co_3O_4$ from 5 to 30 ppm; Se from 0.1 to 10 ppm; and $Cr_2O_3$ from 10 to 20 ppm, where the glass has a light transmittance illuminant "A" greater than 50%, a dominant wavelength ($\lambda$) from 487 nm to 498 nm; a solar energy transmittance less than or equal to 64.4%; ultraviolet solar energy transmittance of no more than 51.6%; and an excitation purity less than 12 for a glass thicknesses from 3 to 12 mm.

2. The glass composition according to claim 1 wherein the $Co_3O_4$ is about 20 ppm for a glass thickness of 4 to 5 mm.

3. The glass composition according to claim 1 wherein the glass provides a color dye as defined in the CIE illuminant D65 and 10° standard observer, in the ranges a* (red-green) of −2.8 to −10.2; b* (blue-yellow) 0.1 to −5.0 for thicknesses between 4 and 10 mm.

4. The glass composition according to claim 1 wherein the base glass comprises: $SiO_2$ from 68 to 75% by weight; $Al_2O_3$ from 0 to 5% by weight; CaO from 5 to 15% by weight; MgO from 0 to 10% by weight; $Na_2O$ from 10 to 18% by weight; $K_2O$ from 0 to 5% by weight; and $SO_3$ from 0.05 to 0.3% by weight.

* * * * *